US012652344B2

(12) United States Patent
Yoo et al.

(10) Patent No.: US 12,652,344 B2
(45) Date of Patent: Jun. 9, 2026

(54) FLEXIBLE ELECTRONIC DEVICE

(71) Applicant: SAMSUNG ELECTRONICS CO., LTD., Suwon-si (KR)

(72) Inventors: Areum Yoo, Suwon-si (KR); Hosoon Lee, Suwon-si (KR); Sooyoung Choi, Suwon-si (KR); Sunwoo Kim, Suwon-si (KR); Jinkeun Nam, Suwon-si (KR); Byengchun Park, Suwon-si (KR); Suakjin Lee, Suwon-si (KR); Wonjin Choi, Suwon-si (KR); Jinsoo Choi, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/882,217

(22) Filed: Sep. 11, 2024

(65) Prior Publication Data

US 2025/0008010 A1 Jan. 2, 2025

Related U.S. Application Data

(63) Continuation of application No. PCT/KR2023/001345, filed on Jan. 30, 2023.

(30) Foreign Application Priority Data

Mar. 29, 2022 (KR) ........................ 10-2022-0039072
May 30, 2022 (KR) ........................ 10-2022-0065967

(51) Int. Cl.
$H04M$ *1/02* (2006.01)
*G02B 1/04* (2006.01)
*G02B 1/14* (2015.01)

(52) U.S. Cl.
CPC ............ *H04M 1/0268* (2013.01); *G02B 1/04* (2013.01); *G02B 1/14* (2015.01); *H04M 1/022* (2013.01)

(58) Field of Classification Search
None
See application file for complete search history.

(56) References Cited

U.S. PATENT DOCUMENTS 9,354,476 B2 5/2016 Han et al.
11,320,866 B2 5/2022 Sunwoo et al.
(Continued)

FOREIGN PATENT DOCUMENTS

CN 111756889 A 10/2020
EP 3 737 074 A1 11/2020
(Continued)

OTHER PUBLICATIONS

International Search Report (PCT/ISA/210) issued on May 1, 2023 by the International Searching Authority in International Application No. PCT/KR2023/001345.
(Continued)

*Primary Examiner* — Aneeta Yodichkas
(74) *Attorney, Agent, or Firm* — Sughrue Mion, PLLC

(57) ABSTRACT

The present disclosure relates to an electronic device. The electronic device according to one embodiment of the present disclosure has a flexible display module, wherein the flexible display module includes a patterned window, and the patterned window includes a plurality of first pattern elements having a geometric pattern, and a plurality of second pattern elements extending in a first direction corresponding to a rotation axis direction, so as to connect at least two first pattern elements.

13 Claims, 18 Drawing Sheets

(56) References Cited

U.S. PATENT DOCUMENTS

| | | | |
|---|---|---|---|
| 11,627,679 B2 | 4/2023 | Sunwoo et al. | |
| 11,765,847 B2 | 9/2023 | Sunwoo et al. | |
| 11,871,602 B2 | 1/2024 | Park et al. | |
| 2015/0355384 A1* | 12/2015 | Park | G02B 1/14 |
| | | | 428/201 |
| 2018/0149904 A1* | 5/2018 | Song | G06F 1/1652 |
| 2018/0175310 A1 | 6/2018 | Lee et al. | |
| 2018/0188432 A1* | 7/2018 | Choi | G02B 5/3058 |
| 2021/0135146 A1 | 5/2021 | Kim et al. | |
| 2021/0191467 A1 | 6/2021 | Sunwoo et al. | |
| 2021/0233447 A1 | 7/2021 | Park | |
| 2021/0249614 A1 | 8/2021 | An et al. | |
| 2021/0318730 A1 | 10/2021 | Lee et al. | |
| 2022/0011813 A1* | 1/2022 | Kim | G06F 1/1637 |
| 2022/0107666 A1 | 4/2022 | Kim et al. | |

FOREIGN PATENT DOCUMENTS

| | | | |
|---|---|---|---|
| KR | 10-2015-0017819 A | 2/2015 | |
| KR | 10-2015-0141273 A | 12/2015 | |
| KR | 10-2018-0042515 A | 4/2018 | |
| KR | 10-2018-0079093 A | 7/2018 | |
| KR | 10-2019-0018215 A | 2/2019 | |
| KR | 10-2020-0033001 A | 3/2020 | |
| KR | 10-2146730 B1 | 8/2020 | |
| KR | 10-2176216 B1 | 11/2020 | |
| KR | 10-2246919 B1 | 5/2021 | |
| KR | 10-2021-0096725 A | 8/2021 | |
| KR | 10-2022-0003892 A | 1/2022 | |
| KR | 10-2359719 B1 | 2/2022 | |
| KR | 10-2658429 B1 | 4/2024 | |

OTHER PUBLICATIONS

Written Opinion (PCT/ISA/237) issued on May 1, 2023 by the International Searching Authority in International Application No. PCT/KR2023/001345.

Communication dated Apr. 22, 2025, issued by European Patent Office in European Patent Application No. 23781144.3.

Communication issued Feb. 2, 2026 by the Korean Ministry of Intellectual Property in Korean Patent application No. 10-2022-0065967.

* cited by examiner 310
320
330
340
350
360

*FIG. 12*

| Etching Time | | | 20Min | 40Min | 70Min | 80Min |
|---|---|---|---|---|---|---|
| OCR | Image | | Average 0.029 | | Average 0.032 | |
| | Thickness | | | | | |
| Shape Etching | Image | | | | | |
| | Pattern Size | Height | 0.013 | 0.029 | 0.039 | 0.043 |
| | | Total Length | 1.022 | 0.834 | 0.478 | 0.411 |
| | | Total Width | 0.124 | 0.115 | 0.044 | 0.044 |

FLEXIBLE ELECTRONIC DEVICE

CROSS-REFERENCE TO RELATED APPLICATIONS

This application is a by-pass continuation of International Application No. PCT/KR2023/001345, filed on Jan. 30, 2023, which is based on and claims priority to Korean Patent application numbers 10-2022-0039072 and 10-2022-0065967, respectively filed on Mar. 29, 2022 and May 30, 2022, in the Korean Intellectual Property Office, the disclosures of which are incorporated by reference herein in their entireties.

BACKGROUND

1. Field

The disclosure relates to a flexible electronic device.

2. Description of Related Art

As electronic, information, and communication technologies develop, various functions are being integrated into electronic devices, including a portable communication device. For example, a smartphone may include a function of a sound player, an imaging device, or an electronic notebook, as well as to encompass a communication function, and additional functions may be implemented in the smartphone through installation of additional application(s).

As the popularity and use of smartphones or other personal/portable communication devices spread, users' demand for portability and convenience is on the rise. For example, a touchscreen display may not only serve as an output device of visual information but also provide a virtual keyboard that replaces a mechanical input device (e.g., a button input device). As such, portable communication devices or electronic devices may be made compact while delivering further enhanced applicability (e.g., a larger screen). On the other hand, flexible (e.g., foldable or rollable) displays are commercially desirable and the portability and convenience of use of electronic devices are expected to be further improve.

SUMMARY

Provided is a flexible electronic device which combines the bendable characteristics of a flexible display module with enhanced impact resistance.

According to an aspect of the disclosure, an electronic device includes: a flexible display module comprising a patterned window, wherein the patterned window comprises a base portion, a plurality of first pattern elements and a second pattern element, wherein the plurality of first pattern elements and the second pattern element are formed on the base portion, wherein each of the plurality of first pattern elements comprises a geometric pattern, and wherein the second pattern element extends in a first direction corresponding to a rotation axis direction of the patterned window to connect at least some of the plurality of first pattern elements.

The patterned window may further include a plurality of second pattern elements formed on the base portion, the plurality of second pattern elements including the second pattern element, and the plurality of second pattern elements may be parallel to one another along and may be arranged along a second direction perpendicular to the first direction.

One of the plurality of second patterns has a smaller volume than another one of the plurality of second patterns located farther from the rotation axis in the second direction.

The plurality of second pattern elements may have a same width, and one of the plurality of first patterns has a smaller width or height than another one of the plurality of first patterns located farther from the rotation axis in the second direction.

One of the plurality of first patterns has a greater width or height than another one of the plurality of first patterns located closer to the rotation axis, and one of the plurality of second patterns has a greater width or height than the other pattern of the plurality of second patterns located closer to the rotation axis.

The plurality of first pattern elements and the plurality of second pattern elements may be spaced apart from each other along the second direction, and the base portion may be between first pattern elements, among the plurality of first pattern elements, and second pattern elements, among the plurality of second pattern elements, adjacent to one another.

A length in the first direction of each of the plurality of first pattern elements may be greater than a length of each of the plurality of first pattern elements in the second direction.

Each of the plurality of first pattern elements and each of the plurality of second pattern elements may include a central portion, a height of the central portion of each of plurality of first pattern elements may be greater than a height of the central portion of each of the plurality of second pattern elements, each second pattern element among the plurality of second pattern elements may contact a first pattern element among the plurality of first pattern elements at a boundary, and a height of the plurality of first pattern elements at the boundary may be the same as a height of the plurality of second pattern elements at the boundary.

The plurality of first pattern elements and the second pattern element may be connected to form a predetermined inclination along the first direction.

The patterned window may further include a folding area and an non-folding area, and the plurality of second pattern elements may not be in the non-folding area.

A highest respective point of each of the plurality of first pattern elements and the second pattern element may include a flat portion, and a width of each respective flat portion may be less than or equal to 0.04 μm.

According to an aspect of the disclosure, an electronic device includes: a housing; and a flexible display in a space formed by the housing, wherein the flexible display comprises a display panel and a stacked structure arranged on the display panel, the stacked structure comprising a patterned window and an adhesive layer, and wherein the patterned window comprises a plurality of first pattern elements having a geometric pattern and a second pattern element extending in a first direction corresponding to a rotation axis direction to connect at least two of the plurality of first pattern elements.

The patterned window may further include a plurality of second pattern elements including the second pattern element, and the plurality of second pattern elements may be arranged parallel to one another along a second direction perpendicular to the first direction.

The plurality of second pattern elements may have a same width, and one of the plurality of first patterns has a smaller width or height than another one of the plurality of first patterns located farther from the rotation axis in the second direction.

One of the plurality of first patterns has a greater width or height than another one of the plurality of first patterns located closer to the rotation axis, and one of the plurality of second patterns has a greater width or height than the other pattern of the plurality of second patterns located closer to the rotation axis.

According to an aspect of the disclosure, an electronic device includes: a flexible display module comprising a patterned window, wherein the patterned window comprises a base portion, a plurality of first pattern elements and a plurality of second pattern elements, wherein the plurality of first pattern elements and the plurality of second pattern elements are formed on the base portion, wherein the plurality of first pattern elements and the plurality of second pattern elements are arranged in a plurality of columns extending in a first direction corresponding to a rotation axis of the patterned window, wherein each of the plurality of columns comprises a repeating sequence of a first pattern element of the plurality of first pattern elements and a second pattern element of the plurality of second pattern elements, and wherein each respective second pattern element of the plurality of second pattern elements extends in the first direction and connects first pattern elements of the plurality of first pattern elements that are adjacent to the respective second pattern element in the first direction.

The patterned window may further include a folding area and an non-folding area, and the plurality of second pattern elements may only be formed in the non-folding area.

Each of the plurality of second pattern elements may have a volume and a distance from the rotation axis in a second direction perpendicular to the first direction, and the respective volume of each of the plurality of second pattern elements may increase as the respective distance from the rotation axis of each of the plurality of second pattern elements increases.

Each of the plurality of first pattern elements may have a width, a height, and a distance from the rotation axis in a second direction perpendicular to the first direction, and at least one of the respective width or the respective height of each of the plurality of first pattern elements may increase as the respective distance from the rotation axis of each of the plurality of first pattern elements increases.

A width of the plurality of first pattern elements in a second direction perpendicular to the first direction may be greater than a width of the plurality of second pattern elements in the second direction, or a height of the plurality of first pattern elements may be greater than a height of the plurality of second pattern elements.

Effects achievable in example embodiments of the disclosure are not limited to the above-mentioned effects, but other effects not mentioned may be apparently derived and understood by one of ordinary skill in the art to which example embodiments of the disclosure pertain, from the following description. In other words, unintended effects in practicing embodiments of the disclosure may also be derived by one of ordinary skill in the art from example embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 is a view illustrating an example process of forming a patterned window according to one or more embodiments.

Reference may be made to the accompanying drawings in the following description, and specific examples that may be practiced are shown as examples within the drawings. Other examples may be utilized and structural changes may be made without departing from the scope of the various examples.

DETAILED DESCRIPTION

Embodiments of the present disclosure are now described with reference to the accompanying drawings in such a detailed manner as to be practiced by one of ordinary skill in the art. However, the disclosure may be implemented in other various forms and is not limited to the embodiments set forth herein. The same or similar reference denotations may be used to refer to the same or similar elements throughout the specification and the drawings.

Figure 1:
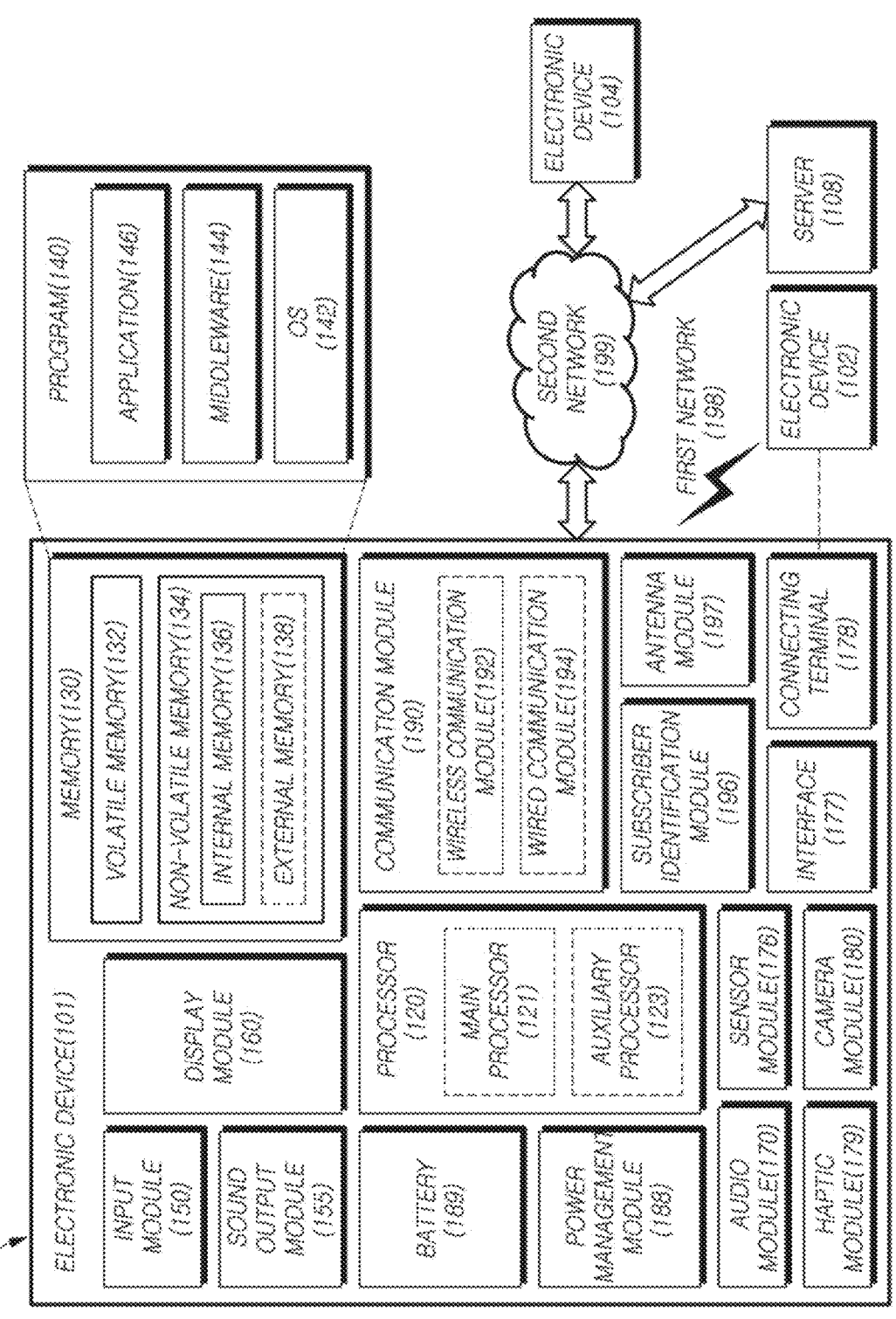
FIG. 1 is a block diagram illustrating an electronic device in a network environment 100 according to one or more embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120 and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
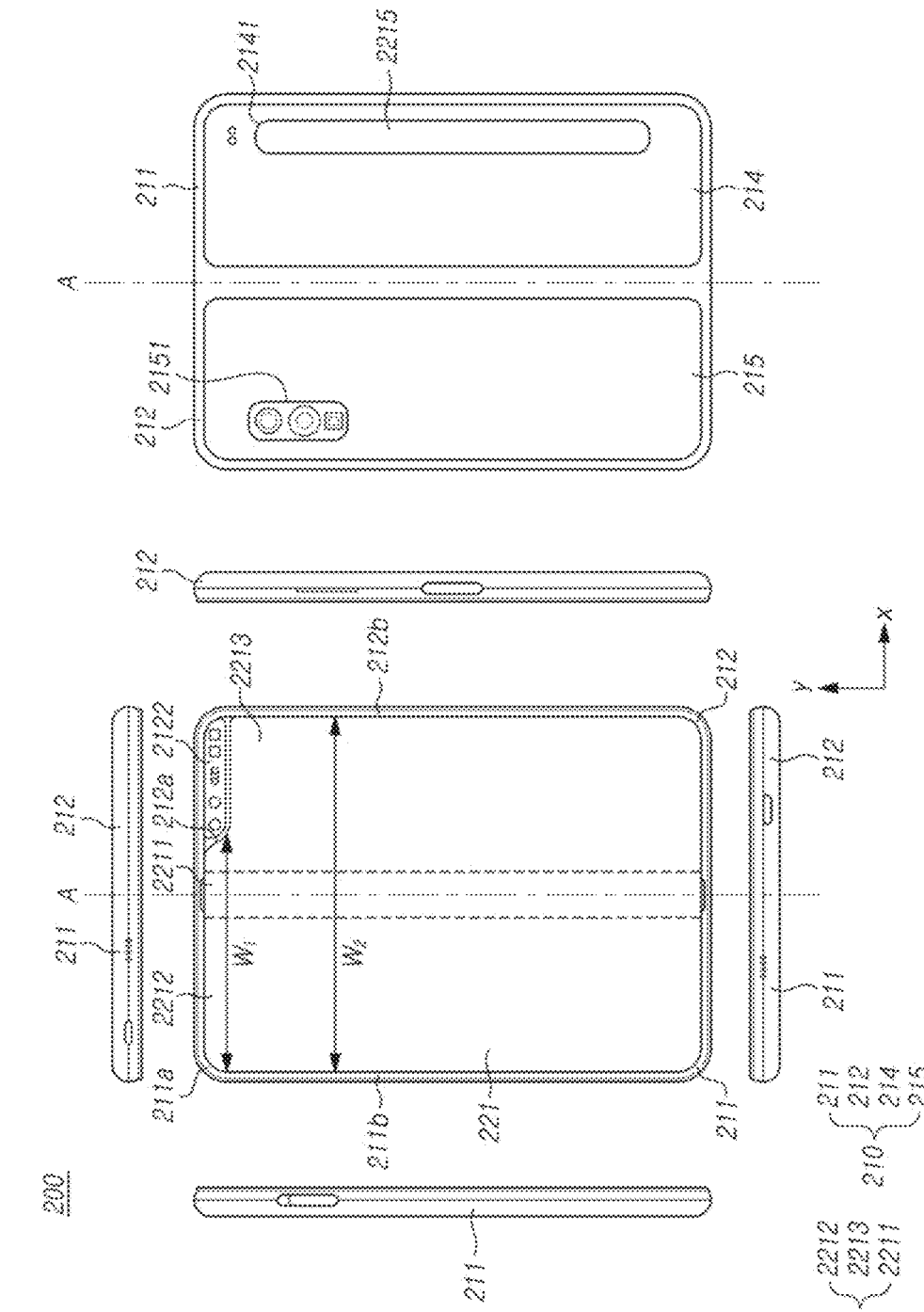
FIG. 2A is a view illustrating an unfolded state of an electronic device according to an embodiment.
Figure 2B:
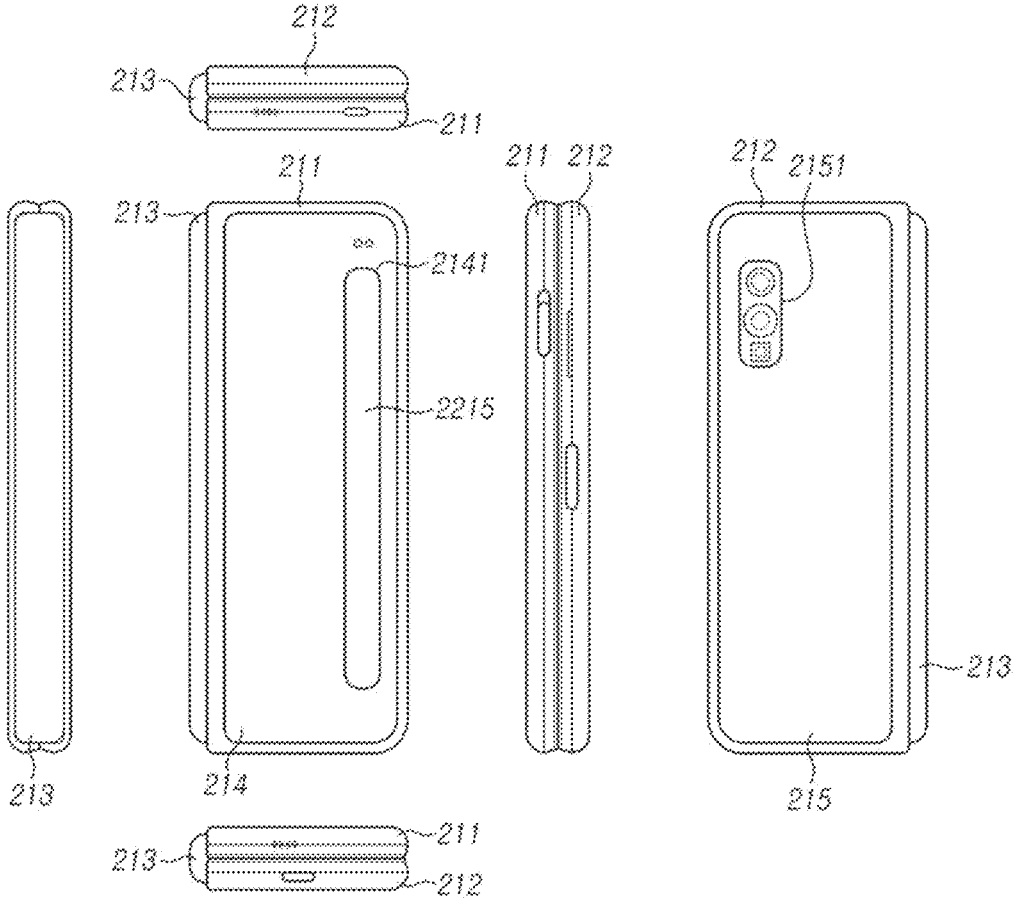
FIG. 2B is a view illustrating a folded state of an electronic device according to an embodiment.

Referring to FIGS. 2A and 2B, according to an embodiment, an electronic device 200 may include a foldable housing 210, a hinge cover 213 to cover a foldable portion of the foldable housing 210, and a flexible or foldable display 221 disposed in a space formed by the foldable housing 210. In the disclosure, a surface on which the display 221 is disposed is defined as a first surface or a front surface of the electronic device 200. Further, the opposite surface of the front surface is defined as a second surface or a rear surface of the electronic device 200. Further, a surface surrounding a space between the front surface and rear surface is defined as a third surface or a side surface of the electronic device 200.

According to an embodiment, the foldable housing 210 may include a first housing structure 211, a second housing structure 212 including a sensor area 2122, a first rear cover 214, and a second rear cover 215. The foldable housing 210 of the electronic device 200 is not limited to the shape and the coupling structure illustrated in FIGS. 2A and 2B, and may be implemented by a combination and/or a coupling of other shapes or parts. For example, in another embodiment, the first housing structure 211 and the first rear cover 214 may be integrally formed, and the second housing structure 212 and the second rear cover 215 may be integrally formed.

In an embodiment, the first housing structure 211 and the second housing structure 212 may be disposed on both sides about a folding axis (axis A), and may be have a substantially symmetrical shape with respect to the folding axis A. As will be described later, an angle or a distance between the first housing structure 211 and the second housing structure 212 may vary depending on whether the electronic device 200 is in an unfolded state, a folded state, or an intermediate state. In an embodiment, unlike the first housing structure 211, the second housing structure 212 may further include the sensor area 2122 in which various sensors are arranged, but they may have a substantially symmetrical shape in other areas. In another embodiment, the sensor area 2122 may be additionally disposed in or replaced with at least a partial area of the first housing structure 211 or the second housing structure 212.

In an embodiment, the electronic device 200 may be operated in an in-folding manner and/or an out-folding manner by rotation of the first housing structure 211 with respect to the second housing structure 212 in a range of 0 to 360 degrees with a hinge structure. According to various embodiments, the hinge structure may be formed in a vertical direction or a horizontal direction when the electronic device 200 is viewed from above. According to various embodiments, the electronic device may have a plurality of hinge structures. For example, the plurality of hinge structures may be all arranged in the same direction. As another example, some hinge structures among the plurality of hinge structures may be arranged in a different direction and folded.

According to an embodiment, as shown in FIG. 2A, the first housing structure 211 and the second housing structure 212 may together form a recess for accommodating the display 221. In an embodiment, due to the sensor area 2122, the recess may have two or more different widths in a direction perpendicular to the folding axis A.

For example, the recess may have a first width w1 between a first portion 211*a* parallel to the folding axis A of the first housing structure 211 and a first portion 212*a* formed in an edge of the sensor area 2122 of the second housing structure 212, and a second width w2 between a second portion 211*b* of the first housing structure 211 and a second portion 212*b* that is parallel to the folding axis A and does not belong to the sensor area 2122 of the second housing structure 212. In this case, the second width w2 may be formed to be longer than the first width w1. In other words, the first portion 211*a* of the first housing structure 211 and the first portion 212*a* of the second housing structure 212 having an asymmetric shape to each other may form the first width w1 of the recess, and the second portion 212*b* of the first housing structure 211 and the second portion 212*b* of the second housing structure 212 having a substantially symmetrical shape to each other may form the second width w2 of the recess. In an embodiment, the first portion 212*a* and the second portion 212*b* of the second housing structure 212 may have different distances from the folding axis A. The width of the recess is not limited to the illustrated example. According to various embodiments, the recess can have multiple widths owing to the shape of the sensor area 2122 or the portion having the asymmetric shape of the first housing structure 211 and the second housing structure 212.

In an embodiment, at least a portion of the first housing structure 211 and the second housing structure 212 may be formed of a metallic material or a non-metallic material having a designated amount of rigidity to support the display 221.

In an embodiment, the sensor area 2122 may be formed to have a predetermined area adjacent to one corner of the second housing structure 212. However, the arrangement, the shape, and the size of the sensor area 2122 are not limited to the illustrated example. For example, in other embodiments, the sensor area 2122 may be provided at another corner of the second housing structure 212 or any area between the top and bottom In an embodiment, components for performing various functions embedded in the electronic device 200 may be exposed onto a front surface of the electronic device 200, through the sensor area 2122 or through one or more openings provided in the sensor area 2122 In various embodiments, the components may include various types of sensors. The sensor may include, for example, at least one of a front camera, a receiver or a proximity sensor, an illuminance sensor, an iris recognition sensor, an ultrasonic sensor, or an indicator.

In an embodiment, the first rear cover 214 may be disposed on one side of a folding axis on the rear surface of the electronic device, and may have, for example, a substantially rectangular periphery, the periphery being covered with the first housing structure 211. Similarly, the second rear cover 215 may be disposed on the other side of the folding axis of the rear surface of the electronic device, of which periphery may be covered with the second housing structure 212.

In an embodiment, the first rear cover 214 and the second rear cover 215 may have a substantially symmetrical shape with respect the folding axis (axis A). However, the first rear cover 214 and the second rear cover 215 do not necessarily have the symmetrical shape, and in another embodiment, the electronic device 200 may have various shapes of the first rear cover 214 and the second rear cover 215. In another embodiment, the first rear cover 214 may be integrally formed with the first housing structure 211, and the second rear cover 215 may be integrally formed with the second housing structure 212.

In an embodiment, the first rear cover 214, the second rear cover 215, the first housing structure 211, and the second housing structure 212 may form a space in which various components of the electronic device 200 (e.g., a printed circuit board, or a battery) may be arranged. According to an embodiment, one or more components may be disposed or visibly exposed on the rear surface of the electronic device 200. For example, at least a portion of a sub-display 2215 may be visually exposed through a first rear area 2141 of the first rear cover 214. In another embodiment, one or more components or sensors may be visually exposed through a second rear area 2151 of the second rear cover 215. According to various embodiments, the sensor may include a proximity sensor and/or a rear camera.

Referring to FIG. 2B, the hinge cover 213 may be disposed between the first housing structure 211 and the second housing structure 212 to cover internal components (e.g., a hinge structure). In an embodiment, the hinge cover 213 may be covered with a portion of the first housing structure 211 and the second housing structure 212 or may be exposed to the outside, according to a state of the electronic device 200 (a flat state or a folded state).

For example, as shown in FIG. 2A, when the electronic device 200 is in an unfolded state, the hinge cover 213 may not be exposed to the outside as it is covered with the first housing structure 211 and the second housing structure 212. For example, as shown in FIG. 2B, when the electronic device 200 is in a folded state (e.g., a fully folded state), the hinge cover 213 may be exposed to the outside between the first housing structure 211 and the second housing structure 212. For example, when the first housing structure 211 and the second housing structure 212 are in an intermediate state that they are folded with a certain angle, the hinge cover 213 may be partially exposed to the outside between the first housing structure 211 and the second housing structure 212. However, in this case, the exposed area may be smaller than in the fully folded state. In an embodiment, the hinge cover 213 may include a curved surface.

The display 221 may be disposed on a space formed by the foldable housing 210. For example, the display 221 may be seated on a recess formed by the foldable housing 210 and may make up most of the front surface of the electronic device 200.

Accordingly, the front surface of the electronic device 200 may include the display 221, a partial area of the first housing structure 211 adjacent to the display 221, and a partial area of the second housing structure 212. Further, the rear surface of the electronic device 200 may include a first rear cover 214, a partial area of the first housing structure 211 adjacent to the first rear cover 214, a second rear cover 215, and a partial area of the second housing structure 212 adjacent to the second rear cover 215.

The display 221 may refer to a display in which at least a portion of its display area may be transformed into a flat surface or a curved surface. In an embodiment, the display 221 may include a folding area 2211, a first area 2212 disposed on one side with respect to the folding area 2211 (e.g., a left side of the folding area 2211 shown in FIG. 2A), and a second area 2213 disposed on the other side (e.g., a right side of the folding area 2211 shown in FIG. 2A).

The regional division of the display 221 shown in FIG. 2A is only of an example, and the display 221 may be divided into a plurality of areas (e.g., two or four or more areas) according to its structure or function. For example, as shown in FIG. 2A, the area of the display 221 may be divided by the folding area 2211 extending parallel to y-axis or the folding axis (axis A), or may be divided on the basis of another folding area (e.g., the folding area parallel to x-axis) or another folding axis (e.g., the folding axis parallel to x-axis).

The first area 2212 and the second area 2213 may have a substantially symmetrical shape with respect to the folding area 2211. However, unlike the first area 2212, the second area 2213 may include a notch (2214 in FIG. 2C) cut according to the presence of the sensor area 2122, but in other area it may have a substantially symmetrical shape with respect to the first area 2212. In other words, the first area 2212 and the second area 2213 may include a portion having a shape symmetrical to each other and a portion having a shape asymmetric to each other.

Hereinafter, description will be made of the operation of the first housing structure 211 and the second housing structure 212 according to the state of the electronic device 200 (e.g., a flat state and a folded state), and each area of the display 221.

In an embodiment, when the electronic device 200 is in a flat state (e.g., in FIG. 2A), the first housing structure 211 and the second housing structure 212 may form an angle of substantially 180 degrees and may be arranged to face the same direction. A surface of the first area 2212 and a surface of the second area 2213 of the display 221 may form substantially 180 degrees with each other to face the same direction (e.g., the front direction of the electronic device). The folding area 2211 may form the same plane as the first area 2212 and the second area 2213.

In an embodiment, when the electronic device 200 is in a folded state (e.g., in FIG. 2B), the first housing structure 211 and the second housing structure 212 may be disposed to face each other. The surface of the first area 2212 and the surface of the second area 2213 of the display 221 may be arranged to face each other, forming a narrow angle (e.g., between 0 to 10 degrees). At least a portion of the folding area 2211 may be formed of a curved surface having a predetermined curvature.

In an embodiment, when the electronic device 200 is in a folded state (e.g., in FIG. 2B), the first housing structure 211 and the second housing structure 212 may be arranged with at a certain angle. The surface of the first area 2212 and the surface of the second area 2213 of the display 221 may form an angle greater than that of the folded state and smaller than that of the unfolded state. At least a portion of the folding area 2211 may be formed of a curved surface having a predetermined curvature, and the curvature in this case may be smaller than that in a folded state.

Figure 2C:
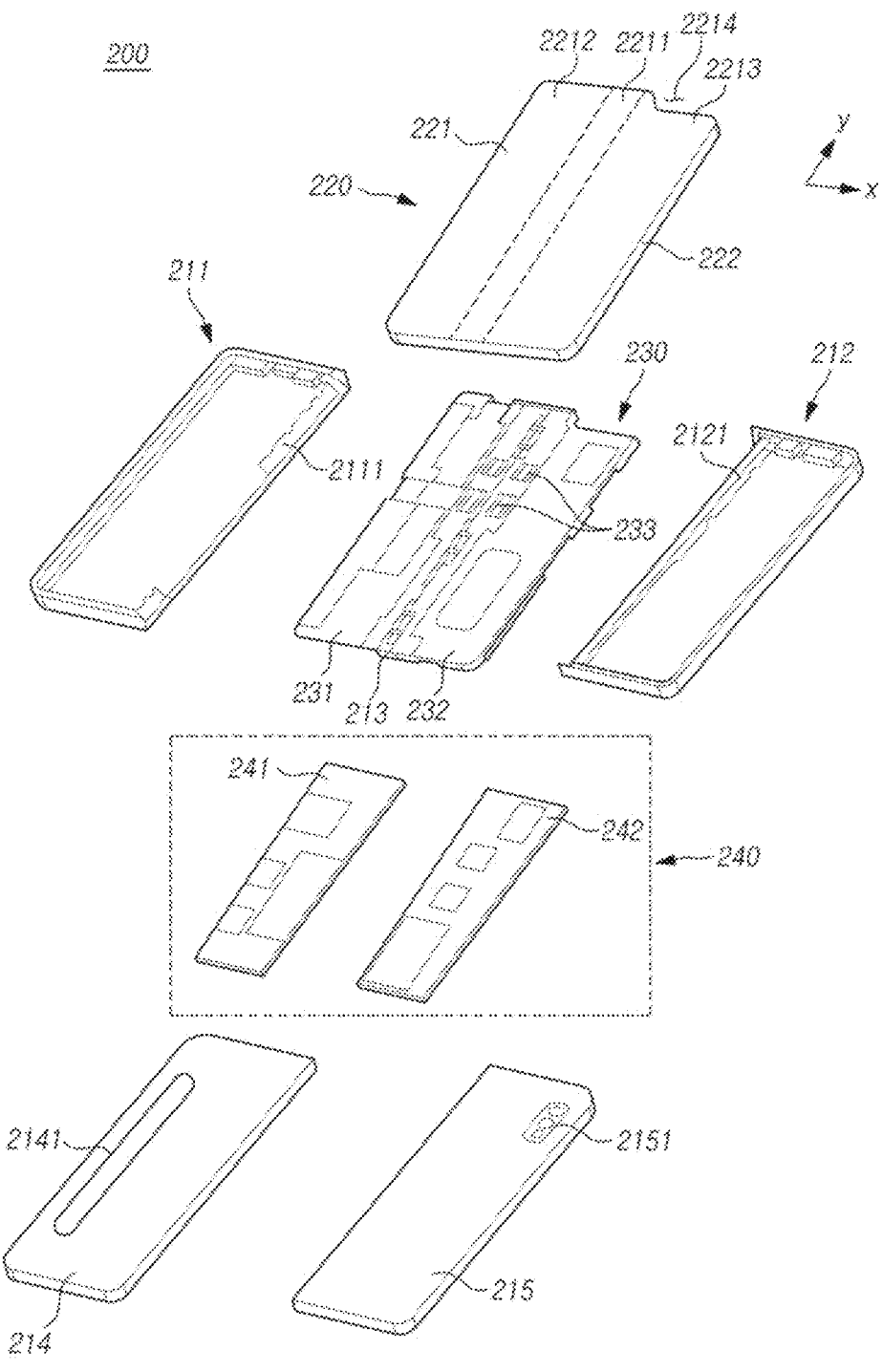
FIG. 2C is an exploded perspective view illustrating an electronic device according to an embodiment.

FIG. 2C is an exploded perspective view illustrating an electronic device according to an embodiment.

Referring to FIG. 2C, according to an embodiment, the electronic device 200 may include a display unit 220, a bracket assembly 230, a substrate 240, a first housing structure 211, a second housing structure 212, a first rear cover 214, and a second rear cover 215. In the disclosure, the display unit 220 may be referred to as a display module or a display assembly.

The display unit 220 may include a display 221 and one or more plates 222 or layers on which the display 221 is seated. In an embodiment, the plate 222 may be disposed between the display 221 and the bracket assembly 230. The display 221 may be disposed on at least a portion of one surface of the plate 222 (e.g., an upper surface with respect to FIG. 2C) The plate 222 may be formed in a shape corresponding to the display 221. For example, a portion of the plate 222 may be formed in a shape corresponding to the notch 2214 of the display 221.

The bracket assembly 230 may include a first bracket 231, a second bracket 232, a hinge structure disposed between the first bracket 231 and the second bracket 232, a hinge cover 213 that covers when the hinge structure is viewed from the outside, and a wiring member 233 (e.g., a flexible printed circuit board (FPC)) crossing the first bracket 231 and the second bracket 232.

In an embodiment, between the plate 222 and the substrate 240 may be disposed the bracket assembly 230. For example, the first bracket 231 may be disposed between the first area 2212 of the display 221 and the first substrate 241. The second bracket 232 may be disposed between the second area 2213 of the display 221 and the second substrate 242.

In an embodiment, at least a portion of the wiring member 233 and the hinge structure may be disposed inside the bracket assembly 230. The wiring member 233 may be disposed in a direction (e.g., x-axis direction) crossing the first bracket 231 and the second bracket 232. The wiring member 233 may be disposed in a direction (e.g., x-axis direction) perpendicular to the folding axis (e.g., y-axis or the folding axis A of FIG. 2A) of the folding area 2211 of the electronic device 200.

As mentioned above, the substrate 240 may include a first substrate 241 disposed on the first bracket 231 side and the second substrate 242 disposed on the second bracket 232 side. The first substrate 241 and the second substrate 242 may be disposed inside a space formed by the bracket assembly 230, the first housing structure 211, the second housing structure 212, the first rear cover 214, and the second rear cover 215. Components for implementing various functions of the electronic device 200 may be mounted on the first substrate 241 and the second substrate 242.

The first housing structure 211 and the second housing structure 212 may be assembled to each other so as to be coupled to both sides of the bracket assembly 230, in a state in which the display unit 220 is coupled to the bracket assembly 230. As will be described later, the first housing structure 211 and the second housing structure 212 may be coupled to the bracket assembly 230, sliding from both sides of the bracket assembly 230.

In an embodiment, the first housing structure 211 may include a first rotation support surface 2111, and the second housing structure 212 may include a second rotation support surface 2121 corresponding to the first rotation support surface 2111. The first rotation support surface 2111 and the second rotation support surface 2121 may include a curved surface corresponding to the curved surface included in the hinge cover 213.

In an embodiment, when the electronic device 200 is in an unfolded state (e.g., the electronic device of FIG. 2A), the first rotational support surface 2111 and the second rotational support surface 2121 may cover the hinge cover 213 so that the hinge cover 213 is not exposed to the rear surface of the electronic device 200 or may be minimally exposed. When the electronic device 200 is in a folded state (e.g., the electronic device of FIG. 2B), the first rotation support surface 2111 and the second rotation support surface 2121 may rotate along a curved surface included in the hinge cover 213 so that the hinge cover 213 may be maximally exposed to the rear surface of the electronic device 200.

One or more display components provided as at least a portion of the display module 221 of FIGS. 2A-2C generally use a flexible material to be bent or folded. In particular, the composite stacked structure, arranged outside the display module 221, is closely related to the ability to receive an external impact, such as direct contact with a physical input element (e.g., a finger or a digital pen). Although the outer components of the display module 221 need to have impact resistance, a flexible movement, such as bending or folding, may not be realized if the hardness or thickness of the material is increased.

The electronic device 200 (e.g., a display device), according to an embodiment, may include a composite stacked structure configured not only to enhance impact resistance but also to maintain flexible characteristics. Hereinafter, a display panel provided in the electronic device 200 according to an embodiment is described, and a composite stacked structure introduced as at least a component (e.g., the first window 340 of FIG. 3) of the corresponding display panel is described with reference to the subsequent descriptions and drawings.

Figure 3:
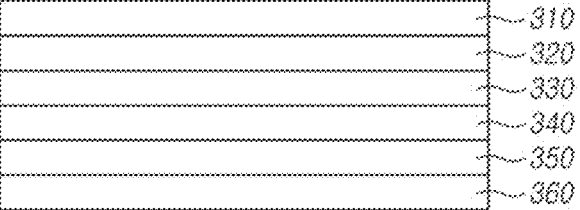
FIG. 3 is a cross-sectional view illustrating an example display module according to one or more embodiments.

FIG. 3 is a cross-sectional view illustrating an example display module acceleration change value according to one or more embodiments.

Referring to FIG. 3, a display module (221 of FIGS. 2A-2C) of an electronic device (200 of FIGS. 2A-2C) may include at least one of a metal layer 360, a display panel 350, a first window 340 layer, a second window 320 layer, an adhesive layer 330, or a protective layer 310.

In an embodiment, the adhesive layer 330 may couple at least two of the metal layer 360, the display panel 350, the first window 340 layer, the second window 320 layer, or the protective layer 310 to each other. The adhesive layer 330 may be, e.g., a pressure sensitive adhesive (PSA). The adhesive layer 330 may include, as another example, at least one of an optical clear adhesive (OCA), a PSA, a thermally reactive adhesive, a general adhesive, or a double-sided tape. As used herein, the "adhesive layer 330" may be interchangeably used as an "adhesive" or an "adhesive material." The term "adhesive layer 330" refers to an adhesive or an adhesive material as a layer element of a stacked structure, and the term "adhesive" or "adhesive material" refers to a component that couples two or more components.

In an embodiment, the display panel 350 may be adhered to the first window 340 layer so as to be arranged below the first window 340 layer. The display panel 350 may be implemented to include, e.g., a plurality of organic light emitting diodes (OLEDs) but is not limited thereto. For example, the display panel 350 may be implemented in various forms such as a liquid crystal display (LCD) panel, a micro-LED panel, or the like. In an embodiment, the display panel 350 may be bent, folded, or rolled by an external force, and the display panel 350 may be referred to as the flexible display panel 350.

In an embodiment, the first window 340 layer may be arranged on the display panel 350. The first window 340 layer may be arranged on the display panel 350 to protect the display panel 350 from the outside (e.g., external impact). In an embodiment, the first window 340 layer may be bent, folded, or rolled to correspond to bending, folding, or rolling of the display panel 350. The first window 340 layer operatively coupled to the flexible display panel 350 may be provided as a rear glass but is not limited thereto. The first window 340 layer may be implemented as a chemically cured glass, and in the disclosure, the means and/or method for chemically curing are not limited to any particular means and/or method.

In an embodiment, the second window 320 layer may be arranged (e.g., disposed) above the first window 340 layer. The second window 320 layer may be coupled to the first window 340 layer by the adhesive layer 330. The second window 320 layer may be formed of a material identical to or different from the first window 340 layer. In an embodiment, the second window 320 layer may contain, e.g., a polymer resin. The polymer resin may include, e.g., polyethylene terephthalate (PET). In an embodiment, the second window 320 layer may be arranged (e.g., disposed) above the first window 340 layer to enhance impact resistance of the display module 221 of FIGS. 2A-2C. In particular, the second window 320 layer may prevent the first window 340 layer and the display panel 350 arranged (e.g., disposed) below from being damaged.

In an embodiment, the protective layer 310 may be arranged (e.g., disposed) above the second window 320 layer. The protective layer 310 includes, e.g., a hard coating layer. The hard coating layer has high strength and may protect one or more components therebelow. Further, the protective layer 310 may enhance reliability by reducing twisting or delamination of the window portion under harsh conditions, such as high temperature or high humidity, and may absorb external impacts. In an embodiment, the protective layer 310 may include at least a portion of a functional layer as well as the hard coating layer. The functional layer may be at least one of an anti-fingerprint coating layer, an anti-fouling coating layer, an anti-reflection coating layer, or an anti-glare coating layer.

In an embodiment, the metal layer 360 may be arranged (e.g., disposed) under the display panel 350. The metal layer 360 may be at least one of a steel use stainless (SUS) or a lattice layer including a pattern such as an opening or a recess.

Hereinafter, one or more composite stacked structures applied to the display module 221 of FIGS. 2A-2C are disclosed. Here, the composite stacked structure may be arranged at a position corresponding to the above-described first window 340 layer of FIG. 3 or may be arranged to integrally replace the first window 340 layer and the second window 320 layer coupled by the adhesive layer 330. Hereinafter, a composite stacked structure according to an embodiment is described with reference to the drawings. For reference, the composite stacked structure may be interchangeably used with the term "stacked bonded glass structure" or may be interchangeably used with the material and/or components of one or more components constituting the composite stacked structure but is not limited thereto.

Figure 4:
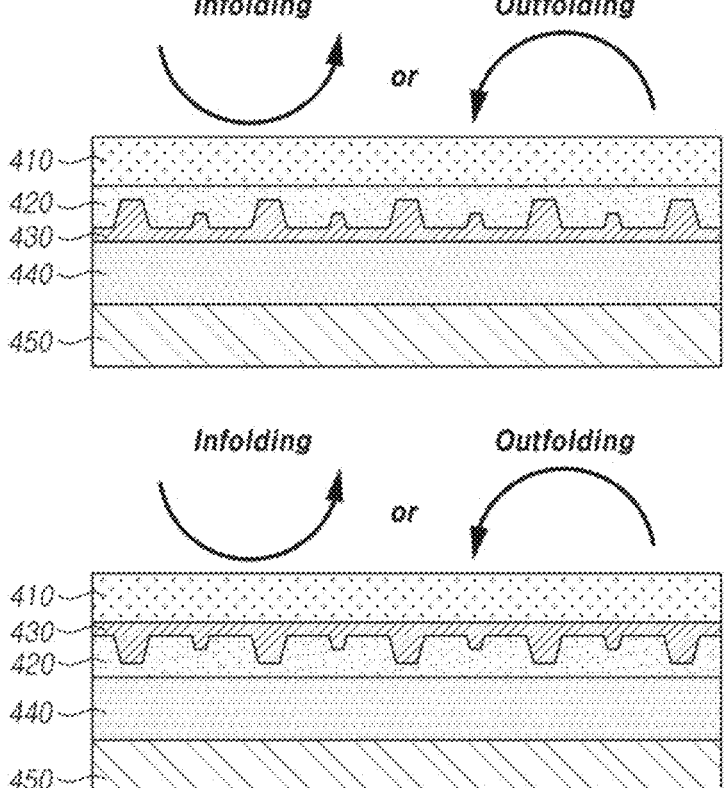
FIG. 4 is a cross-sectional view illustrating an example in-foldable/out-foldable display module according to one or more embodiments.

FIG. 4 is a cross-sectional view illustrating an example in-foldable/out-foldable display module according to one or more embodiments.

Referring to FIG. 4, a display module may include, or be composed of, at least some of a protective layer 410, an adhesive layer 420, a patterned window 430, an impact absorbing layer 440, and a display panel 450. The protective layer 410, the adhesive layer 420, and the display panel 450 may be understood as the components described above with reference to FIG. 3, and thus a further description thereof is omitted. The impact absorbing layer 440 is a functional layer for absorbing an external impact on the display panel 450 and may be implemented as a polymer layer and may be added or omitted based on requirements for impact resistance. In an embodiment, the patterned window 430 may be arranged at a position corresponding to the first window described above with reference to FIG. 3.

The display module mentioned in one or more embodiments may include the patterned window 430. The patterned window 430 may not only enhance the flexibility of the flexible display but may also enhance impact resistance according to the degree of patterning.

Further, in an embodiment, the patterned window 430 and the adhesive layer 420 may be repositioned with respect to each other. The patterned side surface of the patterned window 430 may be arranged (e.g., disposed) to face the adhesive layer 420, and the unpatterned side surface (i.e., flat side surface) of the patterned window 430 may be surface-to-surface coupled to or bonded to another component.

In an embodiment, the patterned window 430 may be folded together as the display module is folded. If the display module is a foldable display, the display module may be folded while rotating about the folding axis. In the following description, the folding axis direction may be referred to as a first direction (the y-axis direction of FIG. 5A), and the direction perpendicular to the folding axis may be referred to as a second direction (the x-axis direction of FIG. 5A). Further, the display module may be stacked (e.g., overlaid) along the third direction (the z-axis direction of FIG. 5B), and the third direction may be perpendicular to the first direction and the second direction.

In an embodiment, if an electronic device including a display module is an in-foldable electronic device, a geometric pattern (i.e., a first pattern element) and a rib pattern (i.e., a second pattern element), which are described below, may be formed to protrude in an in-folding direction or a direction opposite to the in-folding direction. In an embodiment, if the electronic device including the display module is an out-foldable electronic device, the geometric pattern (i.e., the first pattern element) and the rib pattern (i.e., the second pattern element) may be formed to protrude in an out-folding direction or a direction opposite to the out-folding direction.

Further, in an embodiment, the adhesive layer 420 may be formed of a material having the same optical characteristics as the patterned window 430. The adhesive layer 420 may be formed of, e.g., a polymer material having a light refractive index equal to or corresponding to the patterned window 430. Since the patterned window 430 and the adhesive layer 420 have the same or corresponding light refractive index, even if the boundary between the patterned window 430 and the adhesive layer 420 is complicatedly formed, the light refractive characteristic may not deteriorate.

Figure 5A:
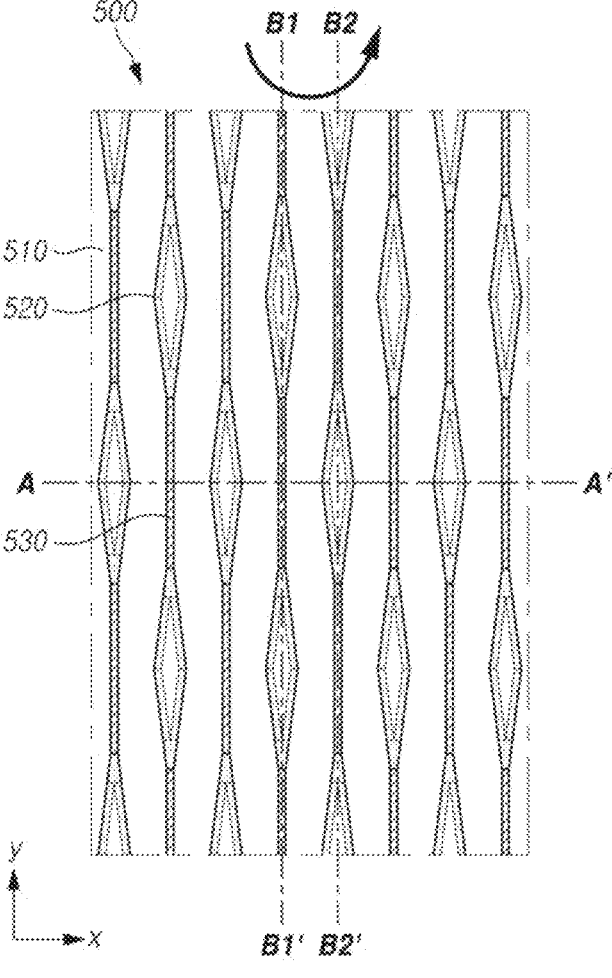
FIGS. 5A, 5B and 5C are views illustrating an example tope view and a cross section of a patterned window according to one or more embodiments.
Figure 5B:
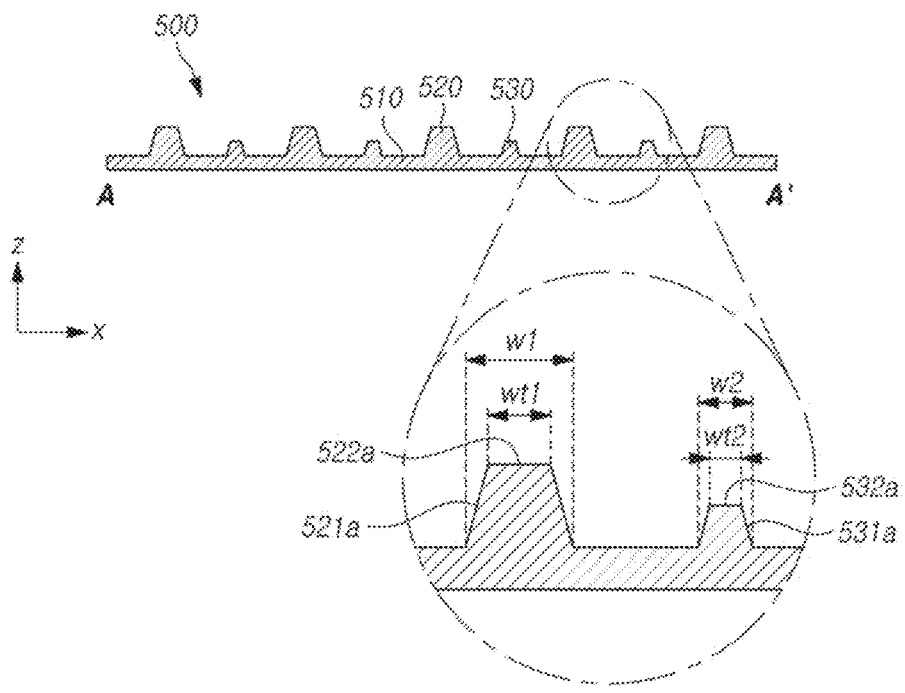
Figure 5C:
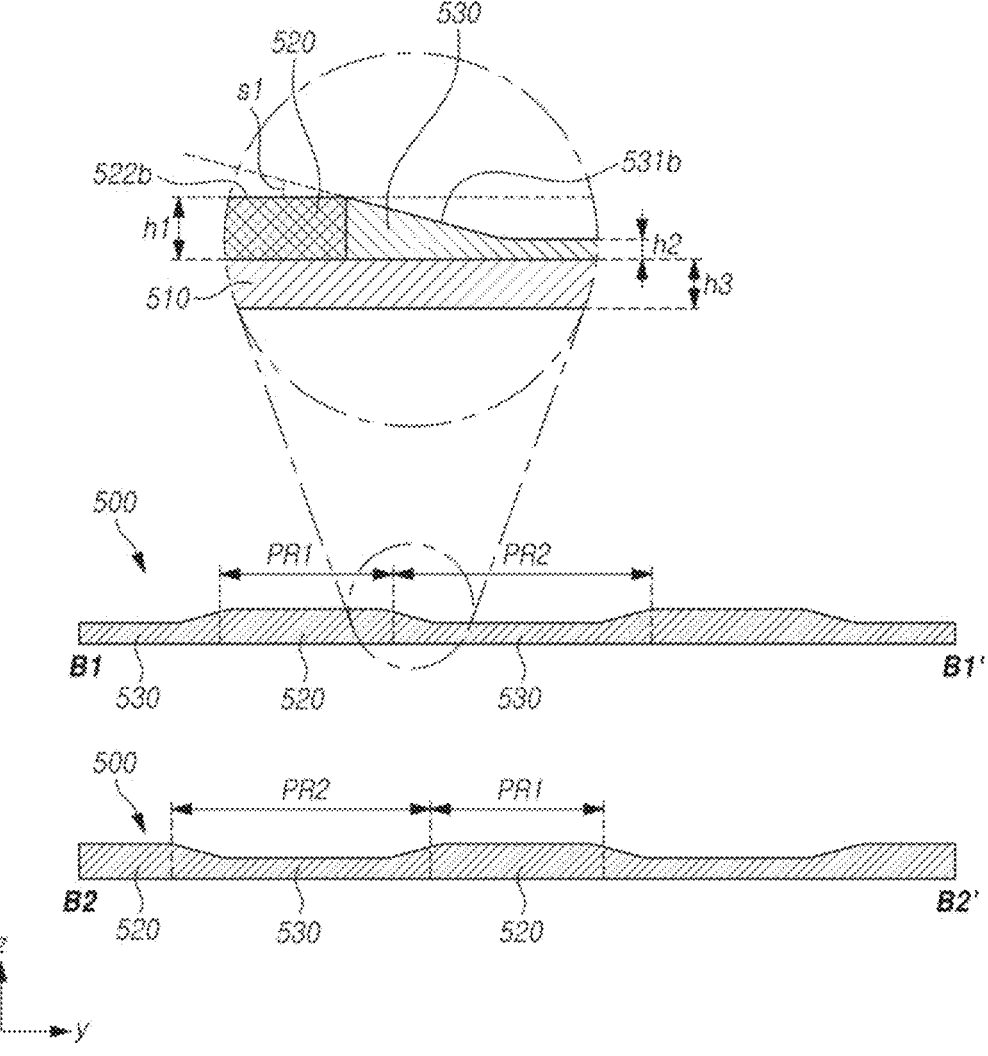

FIGS. 5A to 5C are views illustrating an example top view and a cross section of a patterned window according to one or more embodiments.

FIG. 5A is an example top view of a patterned window.

Referring to FIG. 5A, in an embodiment, a patterned window 500 may include at least one of a base portion 510 (e.g., an unpatterned portion), a first pattern element 520, and a second pattern element 530.

In an embodiment, the first pattern element 520 may include one or more geometric patterns. The geometric patterns may include, e.g., one or more patterns including polygonal, circular, and elliptical shapes. In an embodiment, the geometric pattern may be provided in a shape extending in (i.e., parallel with) the folding axis direction (e.g., the y-axis direction). For example, if the geometric pattern has a rhombus shape, the geometric pattern may be provided in a shape extending in the folding axis direction. In the disclosure, the geometric pattern may be referred to as a first pattern element.

In an embodiment, the second pattern elements 530 may include one or more rib patterns. The rib pattern may be provided as a linear pattern connecting two or more geometric patterns. The linear pattern may include, e.g., at least some of a linear pattern and a curved pattern. More specifically, the rib pattern may be provided as a straight line connecting between geometric patterns and having the same slope or may be provided as a curved line connecting between geometric patterns and having a variable slope. In an embodiment, the rib pattern may be provided to extend in (i.e., parallel with) the direction of the folding axis. Further, in an embodiment, the rib pattern may be formed to connect vertices of two or more geometric patterns. In the disclosure, the rib pattern may be referred to as a second pattern element.

In an embodiment, the plurality of geometric patterns 520 may be arranged in a lattice structure. At least some of the plurality of geometric patterns 520 arranged in the lattice structure may be arranged in parallel with the folding axis, and at least some of the plurality of geometric patterns 520 may be connected by the rib pattern 530 formed in parallel with the folding axis.

Referring to FIG. 5A, it is illustrated that the first pattern element 520 is formed in a rhombus shape, and the rhombus shape is formed in a shape extending in the folding axis direction. Further, the second pattern element 530 may be formed parallel to the first direction (e.g., the folding axis direction and the y-axis direction) and may be formed to connect two or more first pattern elements 520 in the first direction. However, in various embodiments, the first pattern element 520 is not limited to the rhombus shape and may be changed to another geometric pattern 520.

FIG. 5B is a cross-sectional view of a patterned window 500 in a second direction.

Referring to FIG. 5B, in an embodiment, the first pattern element 520 may have a width larger than that of the second pattern element 530 in the second direction (e.g., the x-axis direction (as shown in FIG. 5B, w1>w2)). Further, in an embodiment, the first pattern element 520 may have a height greater than that of the second pattern element 530 with respect to the third direction (e.g., the z-axis direction).

In an embodiment, the second pattern element 530 may be formed between the first pattern elements 520. The second pattern element 530 may be formed along a center line connecting two (2) first pattern elements 520 or may be formed to include a center line between two (2) first pattern elements 520. Two first pattern elements 520 may be connected along the first direction by the second pattern element 530. In other words, among two or more first pattern elements 520, at least some first pattern elements 520 arranged in the first direction may be connected in a line by the second pattern element 530. At least some of the first pattern elements 520 arranged to be spaced apart along the second direction among the two or more first pattern elements 520 may not be connected by the second pattern element 530. Alternatively, the second pattern element 530 may be arranged between at least some of the first pattern elements 520 arranged to be spaced apart along the second direction among two or more first pattern elements 520.

In an embodiment, at least one of the first pattern elements 520 and the second pattern element 530 may have inclined (e.g., sloped) portions (521a and 531a). In an embodiment, the first pattern element 520 may include a flat portion 522a at the highest point and one or more inclined portions 521a that connect or distinguish between the flat portion 522a and the base portion 510. In an embodiment, the second pattern element 530 may include a flat portion 532a at the highest point and one or more inclined portions 531a that connect or distinguish between the flat portion 532a and the base portion 510. Here, the length value of the flat portion 522a and the inclined portion 521a of the first pattern element 520, with respect to the second direction, may be defined as w1, and the length value of the flat portion 522a of the first pattern element 520, with respect to the second direction, may be defined as wt1. For reference, the length value of the flat portion 532a and the inclined portion 531a of the second pattern element 530, with respect to the second direction, may be defined as w2, and the length value of the flat portion 532a of the second pattern element 530, with respect to the second direction, may be defined as wt2. In an embodiment, w2 may be designed to be less than 30% of w1. In an embodiment, each of wt1 and wt2 may be designed to be less than 0.04 μm.

According to an embodiment, referring back to FIGS. 5A and 5B, in the cross section A-A', the sum of the cross-sectional areas of the two (2) second pattern elements 530 directly adjacent to one first pattern element 520 may be designed to be smaller than the maximum cross-sectional area of the first pattern element 520.

According to an embodiment, the first pattern element 520 or the second pattern element 530 may be formed to have a larger volume the farther such patterns are located from the rotation axis in the second direction. For example, the second pattern elements 530 may maintain the same width regardless of the distance from the axis of rotation, and the first pattern element 520 may have a greater width or height the farther such patterns are located from the axis of rotation in the second direction. As another example, the first pattern elements 520 and the second pattern elements 530 may have a greater width or height the farther such patterns are located from the axis of rotation.

According to an embodiment, the arrangement interval between the first pattern elements 520 and the second pattern elements 530 may be formed to decrease as the distance from the rotation axis increases along the second direction. At least part of the first pattern elements 520 or the second pattern elements 530 may increase in width, height, or volume the farther such patterns are located from the axis of rotation along the second direction, and may be formed so that the arrangement interval between the different first pattern elements 520 and the arrangement interval between the different second pattern elements 530 decrease as the increased width, height, or volume increases.

FIG. 5C is a cross-sectional view of a patterned window 500 in a first direction.

Referring to FIG. 5C, as described above, a first pattern element 520 and a second pattern element 530 may be formed on the base portion 510. The first pattern element (geometric pattern) 520 may be formed in a first pattern area PR1, and the second pattern element (rib pattern) 530 connecting the first pattern elements 520 in the first direction may be formed in a second pattern area PR2.

According to an embodiment, the first pattern elements 520 and the second pattern elements 530 may be formed to have continuous profiles in the cross section B1-B1' and the cross section B2-B2', and the height value may be continuous where the first pattern area PR1 is switched to the second pattern area PR2. In an embodiment, the first pattern elements 520 and the second pattern elements 530 arranged along the folding axis direction (the first direction) may be connected to each other, and the first pattern elements 520 and the second pattern elements 530 may be gently connected to a predetermined inclined portion 531*b*. More specifically, the flat portion 522*b* of the first pattern elements 520 and the inclined portion 531*b* of the second pattern elements 530 may be continuously connected to each other. As described above, as the first pattern elements 520 and the second pattern elements 530 are connected by a gentle inclined portion 531*b* rather than a notch, the boundary between the patterns may not be easily visible when viewed from above.

In an embodiment, the first pattern elements 520 may have a thickness value greater than that of the second pattern elements 530 in the third direction (e.g., the z-axis direction). In other words, the first pattern elements 520 may have a greater height value than the second pattern elements 530 (h1>h2).

In an embodiment, the second pattern elements 530 may have the largest slope value s1 at a point where the second pattern element 530 meets the first pattern element 520, and the slope value s1 may gradually decrease or become 0 toward the central portion of the second pattern element 530. The slope value s1 of the second pattern elements 530 may increase as it approaches the point where it meets the first pattern element 520 again. Here, the value of the slope refers to an angle value as an absolute value that has nothing to do with positive and negative. In an embodiment, h2 may be designed to be smaller than 20% of h1.

As such, the patterned window, according to an embodiment, may have a rib pattern, thereby enhancing impact resistance. Further, since the rib pattern is continuously formed (e.g., shaped) while forming a predetermined slope with the geometric pattern, the boundary between the rib pattern and the geometric pattern may not be visually (e.g., with a naked eye) recognized by the user.

Referring back to FIGS. 5A to 5C, in an embodiment, a plurality of second pattern elements may be formed in parallel along the second direction orthogonal (e.g., perpendicular) to the first direction. Further, in an embodiment, the first pattern elements 520 and the second pattern elements 530 may be alternately arranged in the second direction (x-axis direction). For example, in the cross section A-A', the first pattern elements 520 and the second pattern elements 530 may be alternately arranged. Further, the cross section B1-B1' and the cross section B2-B2' represent cross sections of the patterned windows adjacent to each other, and each cross section may be alternately arranged in the second direction (x-axis direction).

Referring to FIG. 5C, the cross section B1-B1' and the cross section B2-B2' are cross sections along different patterning reference lines. In an embodiment, the folding axis may be positioned between a first patterning reference line extending along the first pattern elements 520 and the second pattern elements 530 on one side and a second patterning reference line extending along the first pattern elements 520 and the second pattern elements 530 on the other side adjacent to the one side. In other words, a plurality of patterning reference lines may be formed to arrange the first pattern elements 520 and the second pattern elements 530 in a row along the left and right sides of the folding axis, and the folding axis may be positioned between two (2) patterning reference lines adjacent to each other.

Figure 6A:
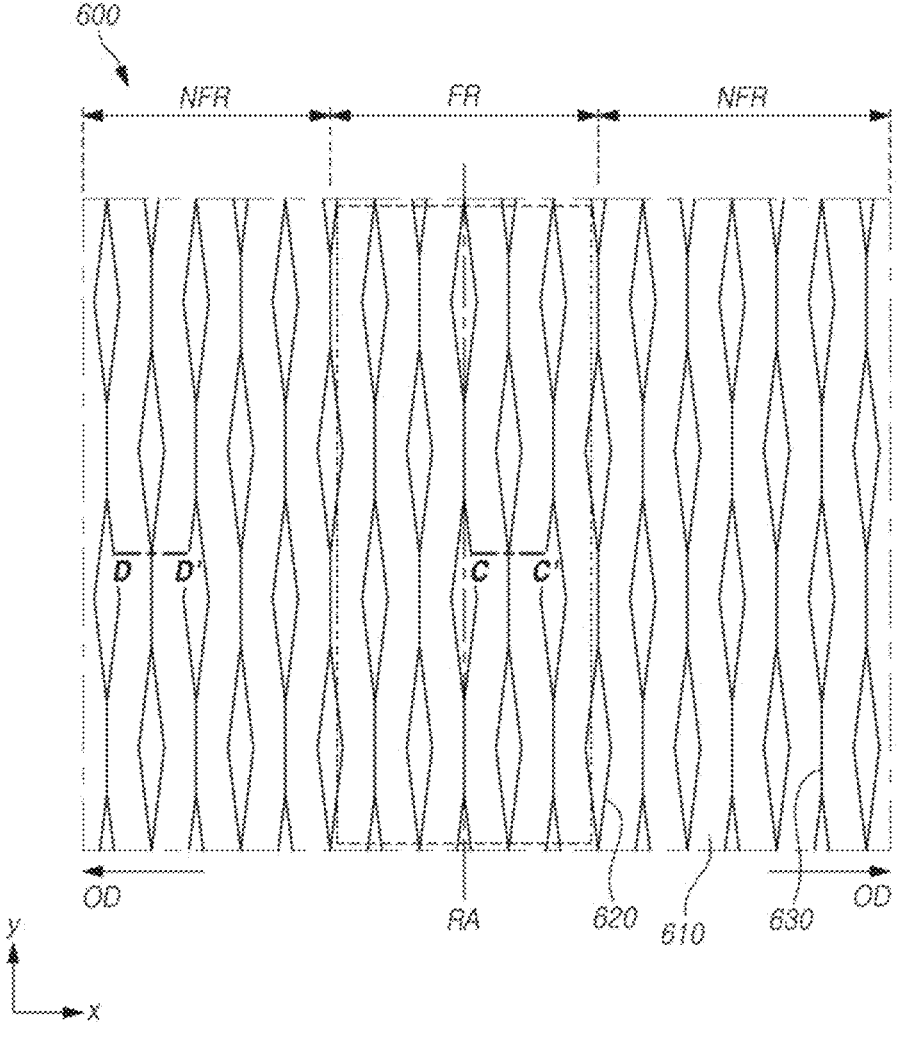
FIGS. 6A and 6B are views illustrating an example change in dimensions of a pattern formed on a patterned window according to one or more embodiments.
Figure 6B:
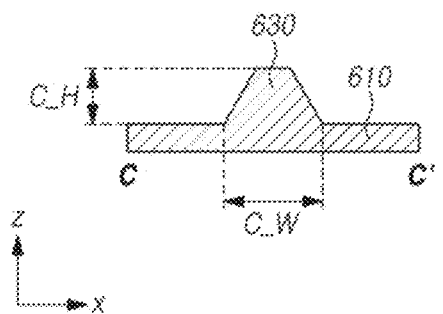
Figure 6B:
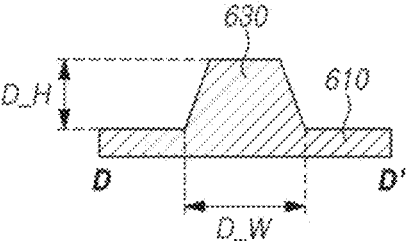

FIGS. 6A and 6B are views illustrating an example change in dimensions of a pattern formed on a patterned window according to one or more embodiments.

Referring to FIG. 6A, a patterned window 600 may be divided into a folding area FR and an non-folding area NFR. In an embodiment, the expression of the non-folding area (NFR) may be named as unfolding area (UFR), flat area, or non-bending area. In an embodiment, a plurality of base portions 610, a plurality of first pattern elements 620, and a plurality of second pattern elements 630 may be formed in the folding area FR and the non-folding area NFR. In other words, in the folding area FR and the non-folding area NFR, there is no difference between the two areas in that the first pattern elements 620 and the second pattern elements 630 are formed.

According to an embodiment, the folding area FR may be a predetermined area including the folding axis RA. According to an embodiment, dimensions of the first pattern elements 620 and/or the second pattern elements 630 may gradually increase the farther such patterns are located from the folding axis RA. According to an embodiment, as a location of a given first pattern element 620 and/or second pattern element 630 grows farther away from the folding axis RA along the vertical direction of the folding axis RA, i.e., the second direction (e.g., the outer direction OD), at least one of the width and/or height of each such pattern may increase. As at least one of the width and/or the height of each pattern increases, the volume of each such pattern increases. Therefore, as the distance from the folding axis RA increases, the impact resistance of the patterned window 600 may be enhanced (e.g., improved).

FIG. 6B illustrates a cross-section C-C' and a cross-section D-D'. The cross-section C-C' represents a cross section of the second pattern element 630 included in the folding area, and the cross-section D-D' represents a cross section of the second pattern element 630 included in the non-folding area.

Referring to FIG. 6B, the entire width of the second pattern element 630 included in the folding area FR may be less than the entire width of the second pattern element 630 included in the non-folding area. As described above, the dimensions of the first pattern elements 620 and the second pattern elements 630 formed in the patterned window 600, according to an embodiment, may increase as the first pattern elements 620 and the second pattern elements 630 are located (e.g., disposed) farther from the folding axis RA along the second direction OD. Since the cross-section C-C' is a cross section for a portion included in the folding area FR and is positioned closer to the folding axis RA than the cross section D-D', the width C_W of the second pattern element 630, illustrated in the cross section C-C', may be formed to be less than the width D_W of the first pattern elements 620 illustrated in the cross-section D-D'. Further, the height C_H of the second pattern element 630 illustrated in the cross-section C-C' may also be formed to be less than the height D_H of the second pattern element 630 illustrated in the cross-section D-D'.

Figure 7:
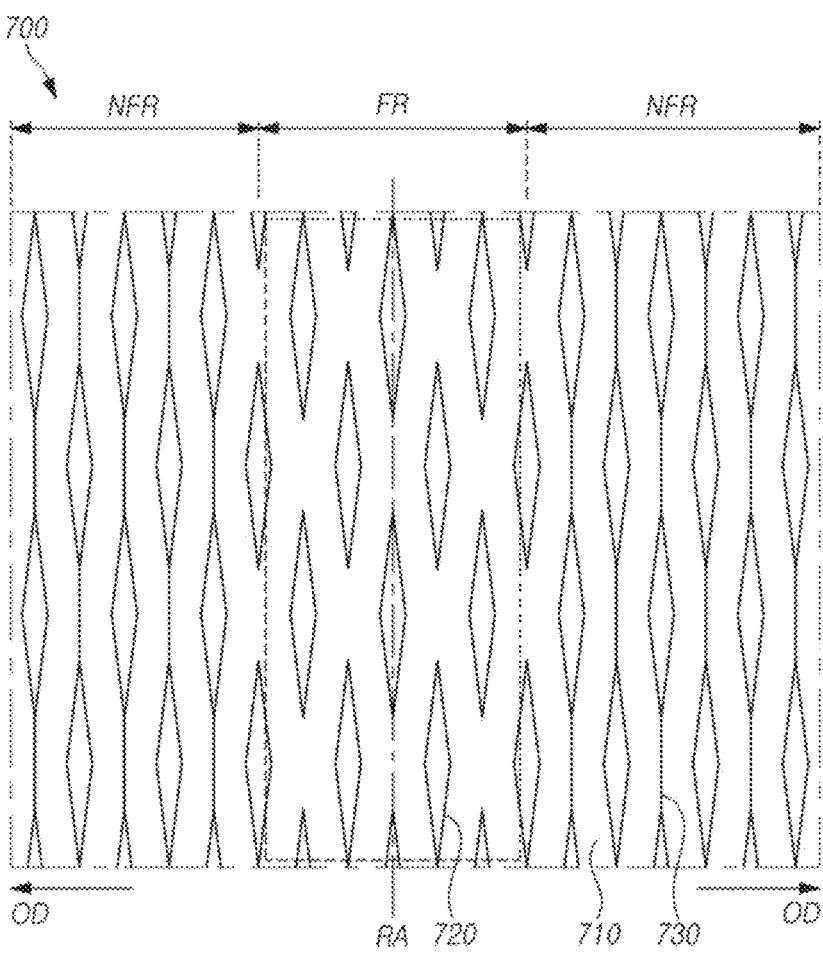
FIGS. 7 and 8 are views illustrating an example modified example of a patterned window according to one or more embodiments.
Figure 8:
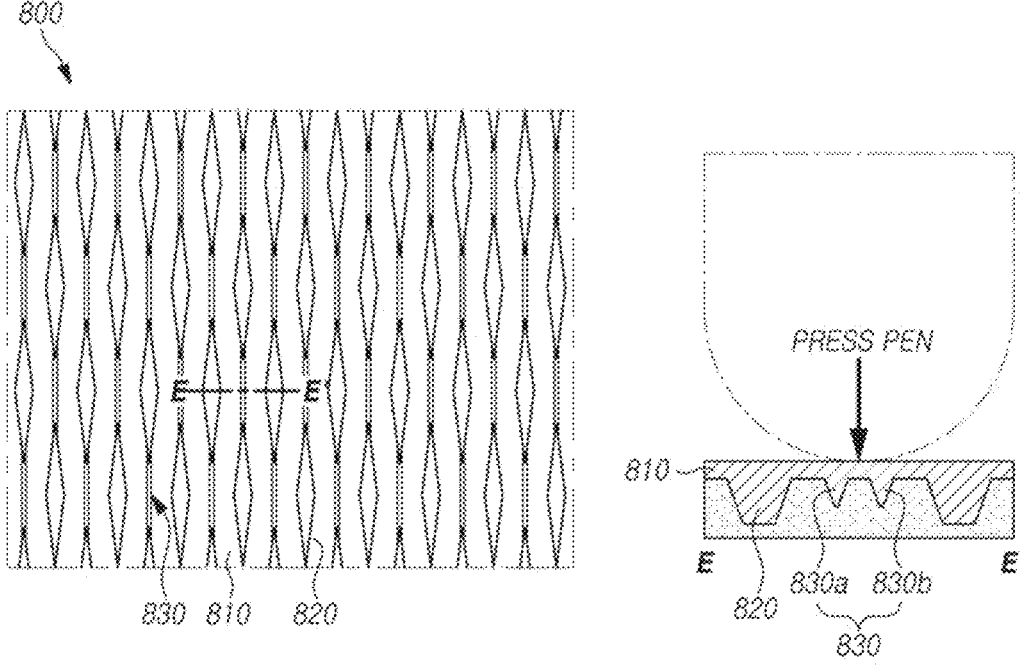

FIGS. 7 and 8 are views illustrating a modified example of a patterned window according to one or more embodiments.

More specifically, FIG. 7 illustrates an embodiment in which a rib pattern (second pattern element) 730 is excluded from the folding area FR but a rib pattern (second pattern element) 730 is formed only in the non-folding area NFR divided from the folding area FR. FIG. 8 illustrates an embodiment in which a rib pattern 830 is formed as two or more lines. The plurality of base portions 710 are similar to the plurality of base portions 610; thus, repeated description is omitted.

Referring to FIG. 7, in an embodiment, the second pattern elements 730 may be formed only in the non-folding area NFR. In the folding area FR, the display module rotates about the folding axis RA, and the rotation characteristic requires a larger force as the resistance by the other components increases. Further, as a larger force is required in folding the display module, the display module itself is more likely to be broken. In an embodiment, in order to remove the resistance of the second pattern elements 730 to the folding operation of the display module, the second pattern elements 730 may be excluded from the folding area FR of the patterned window 700, and the second pattern elements 730 may be formed only in the non-folding area NFR.

In an embodiment, the first pattern elements 720 formed in the non-folding area NFR may be connected along the first direction by the second pattern elements 730, whereas the first pattern elements 720 formed in the folding area FR may be maintained without being connected by the second pattern elements 730. As such, by removing the rib pattern (the second pattern elements 730) from the folding area FR or a predetermined area adjacent to the folding axis RA in at least a portion of the patterned window 700, physical resistance that may occur in the folding operation may be minimized.

Referring to FIG. 8, in an embodiment, the second pattern elements 830 may be formed of two or more line patterns (830a and 830b). According to the embodiment illustrated in FIG. 8, the second pattern element 830 is illustrated as being formed in two line shapes, but is not limited thereto, and the second pattern elements 830 may be implemented as a plurality of parallel line patterns. The plurality of base portions 810 are similar to the plurality of base portions 610 and 710; thus, repeated description is omitted.

In an embodiment, each of the two or more line patterns (830a and 830b) constituting the second pattern element 830 may have the same dimension. Referring back to FIG. 8, if the second pattern element 830 formed of the two line patterns (830a and 830b) is formed, the cross section E-E' along the second direction indicates the second pattern element 830 formed of the two line patterns 830a and 830b and the two first pattern elements 820. Here, the second pattern element 830 may be formed to be spaced apart from the center between the first pattern elements 820 positioned on the same cross section by the same distance in the second direction. Further, each of the line patterns 830a and 830b of the second pattern element 830 may be formed to have the same height and the same width. As such, in an embodiment, the first pattern elements 820 and the second pattern elements 830 may be formed to be symmetrical from the center. As such, since the second pattern elements 830 are formed as a multi-line pattern, if an external force is pressed (e.g., applied) on the patterned window 800, the force may be effectively dispersed. In the disclosure, a rib pattern formed of a plurality of line patterns may be referred to as a multi-line pattern.

Figure 9:
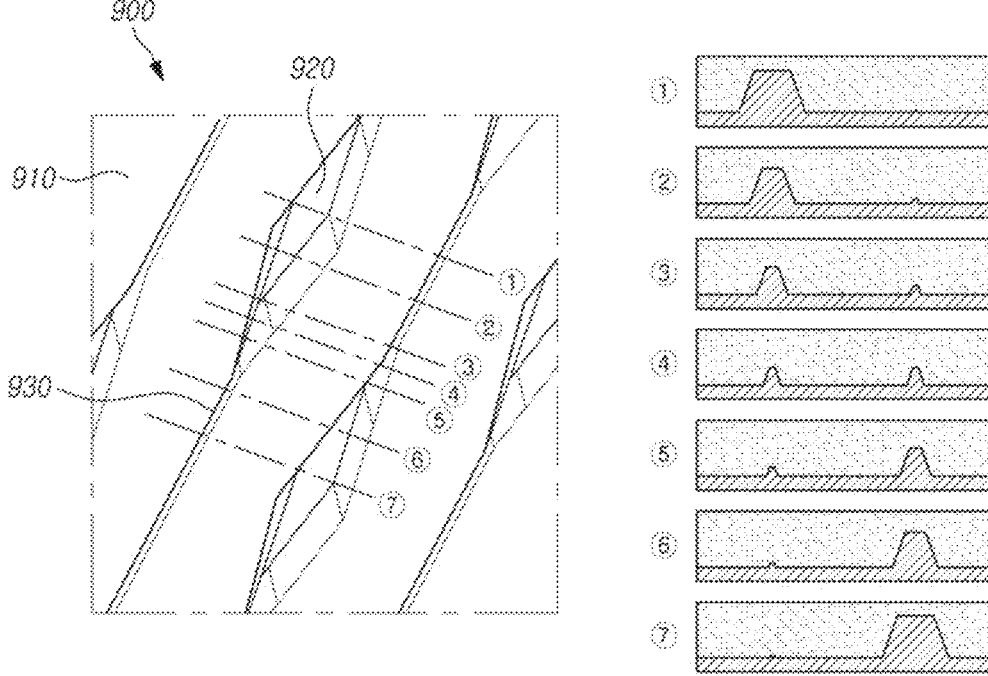
FIG. 9 is a view illustrating an example dimensional relationship between a first pattern element and a second pattern element of a patterned window according to one or more embodiments.

FIG. 9 is a view illustrating an example dimensional relationship between a first pattern element and a second pattern element of a patterned window according to one or more embodiments. More specifically, FIG. 9 illustrates a plurality of cross sections of a patterned window in a second direction.

As illustrated in FIG. 9, the first pattern element 920 and the second pattern element 930 of the patterned window 900 may be formed to change in height and/or width as such patterns are located farther from the rotational axis along the second direction (x-axis direction, OD direction). In an embodiment, the first pattern element 920 may be formed to gradually decrease in height and width away from the center of the first pattern element 920 in the second direction. In an embodiment, the second pattern element 930 may be formed to gradually increase in height and width away from the center of the second pattern element 930 in the second direction. The plurality of base portions 910 are similar to the plurality of base portions 610, 710 and 810; thus, repeated description is omitted.

Figure 10:
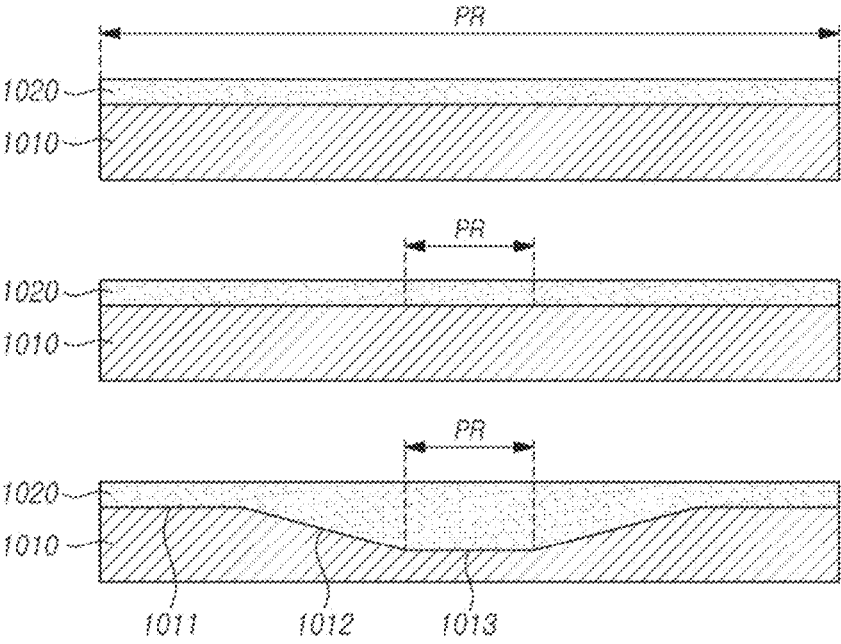
FIG. 10 is a view illustrating at least one example operation of a patterning process and a window before forming a first pattern element and a second pattern element on a patterned window according to one or more embodiments.

FIG. 10 is a view illustrating at least one example operation of a patterning process and a window before forming a first pattern element and a second pattern element on a patterned window according to one or more embodiments.

Referring to FIG. 10, before a patterning process, a normal window 1010 and an adhesive layer 1020 bonded to the normal window 1010 may be provided. Thereafter, a geometric pattern (first pattern element) and a rib pattern (second pattern element) may be formed on at least a portion of the window (the base window 1010) before patterning.

In an embodiment, the first pattern elements and the second pattern elements may be formed over the entire PR of the base window 1010.

In another embodiment, the first pattern elements and the second pattern elements may be formed over a portion PR of the base window 1010.

In another embodiment, at least a portion of the base window 1010 may be pre-etched to have a thinner thickness than the remaining portion. By pre-etching, the base window 1010 may include a first flat portion 1011, a second flat portion 1013, and an inclined portion 1012 connecting the first flat portion 1011 with the second flat portion 1013. In another embodiment, the first pattern elements and the second pattern elements may be formed in one area PR on the second flat portion 1013.

Figure 11A:
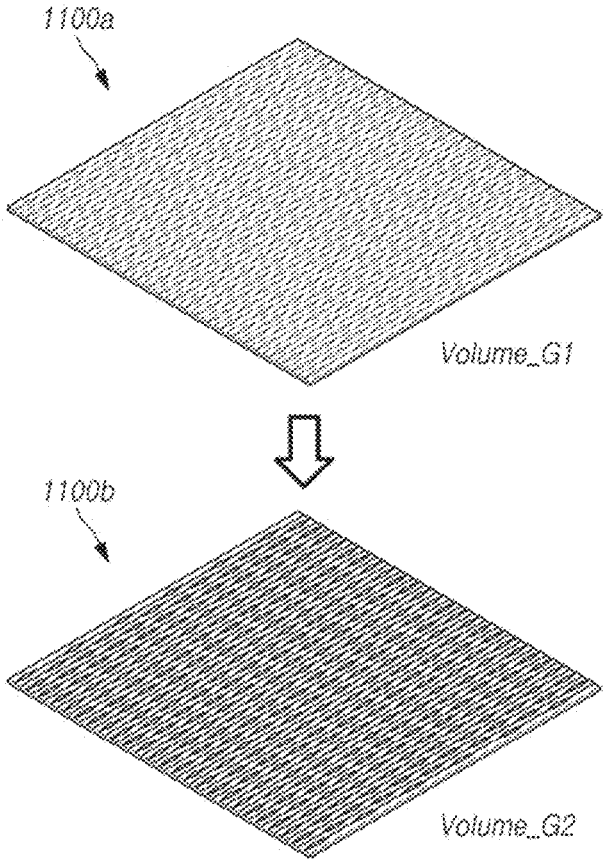
FIGS. 11A and 11B are views illustrating an example change in volume according to a position of a patterned window according to one or more embodiments.
Figure 11B:
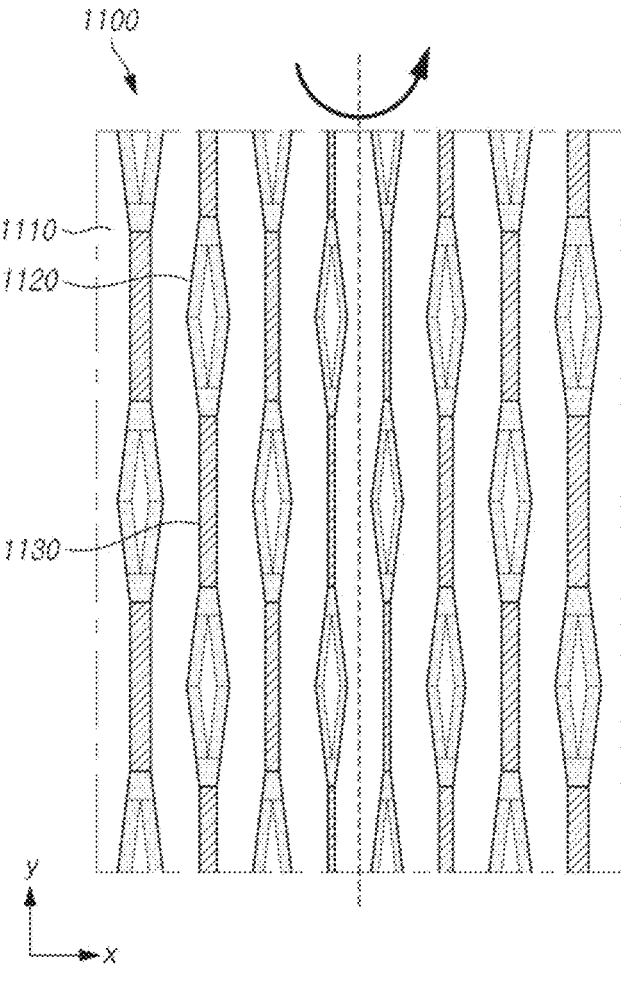

FIGS. 11A and 11B are views illustrating an example change in volume according to a position of a patterned window according to one or more embodiments.

Referring to FIG. 11A, at least a portion 1100a of the patterned window in an area (or folding area) adjacent to the folding axis may have a first volume, and at least another portion 1100b of the patterned window in an area (or non-folding area) far from the folding axis may have a second volume. The first pattern elements and the second pattern elements in the area (or folding area) adjacent to the folding axis have a height and/or width less than the first pattern elements and the second pattern elements in the area (or non-folding area) far from the folding axis. Accordingly, the volume by the first pattern elements and the second pattern elements may be larger in an area positioned farther from the folding axis (the second volume>the first volume).

Referring to FIG. 11B, the patterned window 1100 may have a larger volume away from the folding axis in the second direction (x-axis direction). For example, the first pattern elements 1120 and the second pattern elements 1130 constituting the patterned window 1100 may be formed to have a greater width and/or height away from the folding axis toward the second direction. Accordingly, the volume of the patterned window 1100 may increase toward the second direction.

Further, referring to FIG. 11B, as the width and/or height of the first pattern elements 1120 and/or the second pattern elements 1130 increase as the distance from the folding axis increases along the second direction, one or more of the following may decrease: (a) the distance between the first pattern elements 1120, (b) the distance between the second pattern elements 1130, or (c) the distance between the first pattern element 1120 and the second pattern element 1130 with respect to the second direction. The plurality of base portions 1110 are similar to the plurality of base portions 610, 710, etc.; thus, repeated description is omitted.

FIG. 12 is a view illustrating an example process of forming a patterned window according to one or more embodiments.

Referring to FIG. 12, a patterned window, according to an embodiment, may be performed by a masking process and an etching process. In the masking process, a mask may be patterned on a window substrate. The mask may be formed of acid-resistant ink.

In an embodiment, the etching process may be performed by chemical etching such as hydrofluoric acid and ammonium fluoride. In an embodiment, the mask may be patterned (e.g., structured) on the window substrate so that the etching chemical, such as hydrofluoric acid and ammonium fluoride, contacts portions corresponding to a rib pattern and a geometric pattern.

As the etching compound is applied on the mask, the upper end of the rib pattern portion may start to be etched first, and as the etching proceeds, the mask may start to peel off on the window substrate. Thereafter, etching may be performed from the center of the rib pattern in the depth direction of the window substrate from the time when the rib pattern is completely peeled off. Accordingly, the rib pattern may be made to have a variable thickness (see FIGS. 5A to 5C).

Referring to FIG. 12, it may be identified that the height of the pattern gradually increases and the total length and the full width gradually decrease over the etching time, and accordingly, the plane of the pattern closest to the exterior may be formed with a fine width.

In an embodiment, impact resistance may be enhanced by geometric patterns and a rib pattern connecting the geometric patterns. Referring to Table 1 below (which includes experimental data), "flat structure" means a case in which both geometric patterns and rib patterns are not present, "pattern structure" means a case in which only geometric patterns are present, and "pattern+rib structure" means a case in which both geometric patterns and rib patterns are present. It may be identified that the pen drop characteristics in the flat portion (non-folded area) and the folding portion (folding area) are remarkably enhanced in the "pattern+rib structure" compared to the other cases.

TABLE

| | Classification | flat structure | pattern structure | pattern + rib structure (0.1 t/0.03 t) |
|---|---|---|---|---|
| pen drop (0.3Φ) | flat portion | 8 cm | 50 cm↑ | 50 cm↑ |
| | folding portion | 8 cm | 24 cm | 40 cm |

The electronic device according to an embodiment is an electronic device having a flexible display and, in some cases, may also be implemented as a rollable display, as well as a foldable display. An electronic device having a rollable display may receive at least a portion of the display module and may expose the received portion of the display module to the outside of the housing according to manipulation. In a rollable display, the folding axis may be replaced with a rolling axis in various embodiments of the disclosure.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

The various embodiments of the present disclosure and the terms used herein are not intended to limit the technical features described herein to specific embodiments and should be understood to include various modifications, equivalents, or substitutes of the embodiment. With regard to the description of the drawings, similar reference numerals may be used to refer to similar or related elements. It is to be understood that a singular form of a noun corresponding to an item may include one or more of the things, unless the relevant context clearly indicates otherwise. In this document, each of the phrases such as "A or B," "at least one of A and B," "at least one of A or B," "A, B, or C," "at least one of A, B, and C," and "at least one of A, B, or C," may include any one of the items enumerated together in a corresponding one of the phrases, or all possible combinations thereof. Terms such as "the first" and "the second," or "first" and "second" may be used to distinguish a corresponding component from another, and does not limit the corresponding components in view of other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

The term "module" used in various embodiments of the document may include a unit implemented in hardware, software, or firmware, and be used interchangeably with terms such as, e.g., logic, logic block, component, or circuitry. The module may be a single integral component, or a minimum unit or a part of the integrally configured component or the component that performs one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a flexible display module comprising a patterned window, wherein the patterned window comprises a base portion, a plurality of first pattern elements and a second pattern element, wherein the plurality of first pattern elements and the second pattern element are formed on the base portion, and wherein the second pattern element is in direct contact with at least two of the plurality of first pattern elements,
wherein each of the plurality of first pattern elements comprises a geometric pattern, and
wherein the second pattern element extends in a first direction corresponding to a rotation axis direction of the patterned window to connect at least some of the plurality of first pattern elements.

2. The electronic device of claim 1,
wherein the patterned window further comprises a plurality of second pattern elements formed on the base portion, the plurality of second pattern elements including the second pattern element, and
wherein the plurality of second pattern elements are parallel to one another along and are arranged along a second direction perpendicular to the first direction.

3. The electronic device of claim 2,
wherein one of the plurality of second patterns has a smaller volume than another one of the plurality of second patterns located farther from the rotation axis in the second direction.

4. The electronic device of claim 3,
wherein the plurality of second pattern elements have a same width,
wherein one of the plurality of first patterns has a smaller width or height than another one of the plurality of first patterns located farther from the rotation axis in the second direction.

5. The electronic device of claim 3,
wherein one of the plurality of first patterns has a greater width or height than another one of the plurality of first patterns located closer to the rotation axis, and
wherein one of the plurality of second patterns has a greater width or height than the other pattern of the plurality of second patterns located closer to the rotation axis.

6. The electronic device of claim 2,
wherein the plurality of first pattern elements and the plurality of second pattern elements are spaced apart from each other along the second direction, and
wherein the base portion is between first pattern elements, among the plurality of first pattern elements, and second pattern elements, among the plurality of second pattern elements, adjacent to one another.

7. The electronic device of claim 2, wherein a length in the first direction of each of the plurality of first pattern elements is greater than a length of each of the plurality of first pattern elements in the second direction.

8. The electronic device of claim 2,
wherein the patterned window further comprises a folding area and a non-folding area, and
wherein the plurality of second pattern elements are not in the non-folding area.

9. The electronic device of claim 2,
wherein each of the plurality of first pattern elements and each of the plurality of second pattern elements comprises a central portion,
wherein a height of the central portion of each of plurality of first pattern elements is greater than a height of the central portion of each of the plurality of second pattern elements,
wherein each second pattern element among the plurality of second pattern elements contacts a first pattern element among the plurality of first pattern elements at a boundary, and
wherein a height of the plurality of first pattern elements at the boundary is the same as a height of the plurality of second pattern elements at the boundary.

10. The electronic device of claim 1,
wherein a highest respective point of each of the plurality of first pattern elements and the second pattern element comprises a flat portion, and
wherein a width of each respective flat portion is less than or equal to 0.04 μm.

11. The electronic device of claim 1, wherein the plurality of first pattern elements and the second pattern element are connected to form a predetermined inclination along the first direction.

12. An electronic device comprising:
a flexible display module comprising a patterned window, wherein the patterned window comprises a base portion, a plurality of first pattern elements and a second pattern element, wherein the plurality of first pattern elements and the second pattern element are formed on the base portion,
wherein each of the plurality of first pattern elements comprises a geometric pattern,
wherein the second pattern element extends in a first direction corresponding to a rotation axis direction of the patterned window to connect at least some of the plurality of first pattern elements,
wherein the patterned window further comprises a plurality of second pattern elements formed on the base portion, the plurality of second pattern elements including the second pattern element, wherein the plurality of second pattern elements are parallel to one another along and are arranged along a second direction perpendicular to the first direction, wherein each of the plurality of first pattern elements and each of the plurality of second pattern elements comprises a central portion, wherein a height of the central portion of each of plurality of first pattern elements is greater than a height of the central portion of each of the plurality of second pattern elements, wherein each second pattern element among the plurality of second pattern elements contacts a first pattern element among the plurality of first pattern elements at a boundary, and wherein a height of the plurality of first pattern elements at the boundary is the same as a height of the plurality of second pattern elements at the boundary.

13. An electronic device comprising:

a flexible display module comprising a patterned window, wherein the patterned window comprises a base portion, a plurality of first pattern elements and a second pattern element, wherein the plurality of first pattern elements and the second pattern element are formed on the base portion, wherein each of the plurality of first pattern elements comprises a geometric pattern, wherein the second pattern element extends in a first direction corresponding to a rotation axis direction of the patterned window to connect at least some of the plurality of first pattern elements, and wherein the plurality of first pattern elements and the second pattern element are connected to form a predetermined inclination along the first direction.

* * * * *